(12) United States Patent
Davis et al.

(10) Patent No.: US 9,912,752 B1
(45) Date of Patent: Mar. 6, 2018

(54) RETENTION-BASED DATA MANAGEMENT IN A NETWORK-BASED DATA STORE

(71) Applicant: Amazon Technologies, Inc., Seattle, WA (US)

(72) Inventors: Timothy James Davis, Seattle, WA (US); Rajesh Shanker Patel, Bellevue, WA (US); Bradley Eugene Marshall, Bainbridge Island, WA (US); Jonathan Robert Collins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 247 days.

(21) Appl. No.: 14/754,570

(22) Filed: Jun. 29, 2015

(51) Int. Cl.
*G06F 15/16* (2006.01)
*H04L 29/08* (2006.01)

(52) U.S. Cl.
CPC .......... *H04L 67/1097* (2013.01); *H04L 67/18* (2013.01)

(58) Field of Classification Search
CPC ............................ H04L 67/1097; H04L 67/18
USPC ........................................................ 709/213
See application file for complete search history.

(56) References Cited

U.S. PATENT DOCUMENTS

| | | | | |
|---|---|---|---|---|
| 7,546,486 B2* | 6/2009 | Slik | ................... | G06F 17/30171 707/999.103 |
| 7,830,632 B2 | 11/2010 | Tang et al. | | |
| 8,103,824 B2* | 1/2012 | Pollack | ................. | G06F 3/0605 711/114 |
| 8,285,681 B2* | 10/2012 | Prahlad | ................. | G06F 17/302 707/640 |
| 8,650,371 B1 | 2/2014 | Wu et al. | | |
| 8,725,965 B2* | 5/2014 | Hart | ..................... | G06F 11/1461 711/1 |
| 8,793,371 B1* | 7/2014 | Nanekar | ............. | H04L 41/0856 709/220 |
| 8,832,409 B2* | 9/2014 | Feldman | ................ | G11B 5/012 711/173 |
| 9,442,803 B2* | 9/2016 | Rueger | ............... | G06F 11/1446 |
| 9,442,997 B2* | 9/2016 | Newhouse | ........ | G06F 17/30138 |
| 9,451,025 B2* | 9/2016 | Kazi | ................... | H04L 67/1097 |
| 9,479,413 B2* | 10/2016 | Curtin | ................. | H04L 43/0876 |
| 9,489,297 B2* | 11/2016 | Peterson | ............. | G06F 12/0246 |

(Continued)

OTHER PUBLICATIONS

"Shingled Magnetic Recording: Areal Density Increase Requires New Data Management," Tim Feldman, Garth Gibson, ;login: the Usenix Magazine, Jun. 2013, vol. 38, No. 3, pp. 22-30.

*Primary Examiner* — Melvin H Pollack
(74) *Attorney, Agent, or Firm* — Robert C. Kowert; Meyertons, Hood, Kivlin, Kowert & Goetzel, P.C.

(57) ABSTRACT

A network-based data store may implement retention-based management techniques for data stored at the network-based data store. When data is received for storage at the network-based data store, a retention time for the data may be determined. Storage locations at persistent storage devices of the network-based data store may be selected according to the retention time. The data may then be placed at the storage locations. When a request to delete data is received, retention times of co-located data may be evaluated to determine whether the deletion may be delayed. Delayed deletions may allow the data to be subsequently deleted with at least some of the co-located data. Repair operations to maintain the data according to a durability policy may be modified according to retention time for a data suffering a loss of redundancy.

20 Claims, 12 Drawing Sheets

(56) References Cited

U.S. PATENT DOCUMENTS

| | | | |
|---|---|---|---|
| 9,559,866 B2* | 1/2017 | Grayson | H04L 43/0876 |
| 9,621,653 B2* | 4/2017 | Chen | H04L 67/1097 |
| 9,626,420 B2* | 4/2017 | Barton | G06F 1/12 |
| 2008/0077633 A1 | 3/2008 | Kaplan et al. | |
| 2014/0046908 A1* | 2/2014 | Patiejunas | G06F 17/30073 |
| | | | 707/687 |
| 2014/0089278 A1 | 3/2014 | Lovinger et al. | |
| 2014/0104724 A1* | 4/2014 | Shiroishi | G11B 5/66 |
| | | | 360/75 |
| 2015/0142942 A1* | 5/2015 | Voruganti | H04L 67/1097 |
| | | | 709/223 |
| 2015/0254088 A1* | 9/2015 | Chou | G06F 9/45541 |
| | | | 709/212 |
| 2015/0293984 A1* | 10/2015 | Zolotusky, Jr. | H04L 67/1097 |
| | | | 707/634 |
| 2016/0026405 A1* | 1/2016 | Dhuse | G06F 11/1092 |
| | | | 711/114 |
| 2016/0043927 A1* | 2/2016 | Larson | H04L 45/02 |
| | | | 370/389 |
| 2016/0110254 A1* | 4/2016 | Cronie | H04L 67/1097 |
| | | | 714/766 |
| 2016/0210061 A1* | 7/2016 | Soncodi | G06F 3/0605 |
| 2016/0226973 A1* | 8/2016 | Appel | H04L 67/1097 |
| 2016/0366217 A1* | 12/2016 | Eda | H04L 67/1095 |
| 2017/0026263 A1* | 1/2017 | Gell | H04L 43/0882 |
| 2017/0031779 A1* | 2/2017 | Helliker | H04L 67/1095 |
| 2017/0090772 A1* | 3/2017 | Kripalani | G06F 3/0605 |

* cited by examiner

RETENTION-BASED DATA MANAGEMENT IN A NETWORK-BASED DATA STORE

BACKGROUND

Large amounts of data maintained for performing various different computing tasks have increased the need to develop storage solutions capable of storing such data in an accessible way. Coupled with the varying types of computing systems used to process these large amounts of data, large scale, highly available data storage is in greater demand than ever. Many different types of large scale storage systems exist for large amounts of data, such as various types of database systems, file systems, key value data stores, and data warehouse systems. However, utilizing these storage systems may require complex or customized applications which may not provide the same performance or ease of implementation as local storage solutions. Simple object storage, however, provides easy-to-use consistent, durable, and available storage for large data objects. Yet, managing such large amounts of data is not without its challenges. For example, accounting for the performance characteristics that different persistent storage devices provide may be difficult without identifying ways to optimize management of data according to the characteristics of persistent data storage devices that are implemented.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement retention-based data management techniques for network-based data stores. Network-based data stores may offer storage capacity for clients across networks so that data storage does not have to be implemented locally. As the amount of data in network-based data stores increases, different techniques to manage the data may be implemented. Data retention times indicating how long data is to be maintained in a network-based data store before it can be deleted, removed, or overwritten may provide many different management insights and benefits for providing network-based storage.

Figure 1:
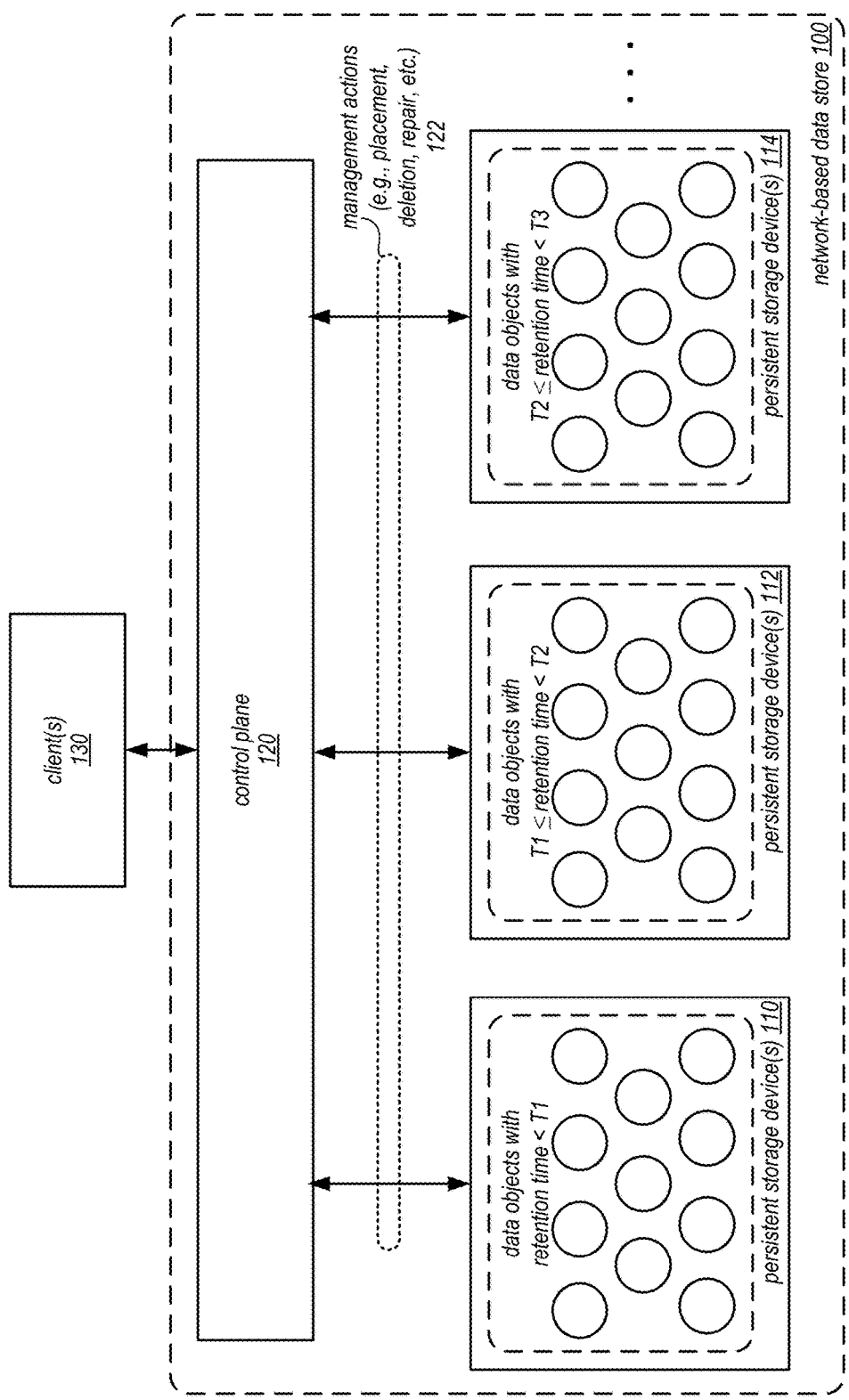
FIG. 1 is a logical block diagram illustrating retention-based data management for a network-based data store, according to some embodiments.

FIG. 1 is a logical block diagram illustrating retention-based data management for a network-based data store, according to some embodiments. Network-based data store 100 may be a data store that provides persistent storage for data to client(s) 130 via a network (not illustrated). Client(s) 130 may submit various requests to add, modify, delete, move, or otherwise change data stored in network-based data store. In return, network-based data store 100 may provide various guarantees (e.g., service level agreements) which specify the performance of the data store with respect to these client requests. For instance, network-based data store 100 may guarantee a particular level of durability for stored data objects, access times for stored data objects, or availability of stored data objects. Client(s) 130 may be unaware of the placement of data objects (or partitions or shards of data objects) in physical storage, allowing network-based data store 100 to make placement and other management decisions that efficiently utilize the resources of network-based data store 100, such as persistent storage device(s) 110, 112, and 114, while still ensuring that guarantees provided to client(s) 130 are met. Network-based data store 100 may thus make placement and other management decisions according to retention times without imposing decision making burdens on the client (e.g., having the client specify a type of storage device that is most cost effective, like a choice between tape-based storage or disk-based storage, at the expense of storage performance). In at least some embodiments, network-based data store 100 may be an unstructured object store, as illustrated in FIG. 1, storing client data as data objects.

Persistent storage device(s) 110, 112, and 114 may be implemented as part of network-based data store 100 to store different data objects for client(s) 130. Persistent storage device(s) 110 may include many different persistent storage devices that store data in variety of ways, such as shingled magnetic recording devices which overlap data tracks in magnetic storage to condense the space consumed to store information. However, as noted above, not all persistent storage devices offer the same performance characteristics. For instance, some magnetic-based persistent storage devices are not shingled. Other persistent storage devices may utilize different storage mediums, such as flash-based storage devices (e.g., solid state drives) or tape-based storage devices. Therefore, network-based data store 100 may implement control plane 120 to provide retention-based data management for data stored in network-based data store 100 to account for these different performance characteristics in view of retention times for data, while still satisfying performance guarantees, as noted above.

For instance, in at least some embodiments, different management actions may be performed based on placing, deleting, repairing, or otherwise grouping data objects with similar retention times together to more optimally perform management operations. Consider the scenario illustrated in FIG. 1, placement operations may place data objects with retention times less than T1 on persistent storage device(s) 110, data objects with retention times greater than or equal to T1 and less than T2 on persistent storage device(s) 112, and data objects with retention times greater than or equal to T2 and less than T3 on persistent storage device(s) 114, and so on. In this way, data may be deleted, reclaimed, or overwritten for persistent storage devices at similar times, amortizing the cost of performing the management operation across multiple data objects (instead of for a single data object). For some persistent storage devices, amortization of management costs significantly increases the efficiency of utilizing the storage device. Shingled magnetic recording (SMR) devices, are one such example. SMR devices have high storage capacity that is achieved at the cost of expensive write or delete operations (due to the overlapping format of writing data to the SMR device as discussed below in FIG. 7B). Grouping or batching the write or delete operations for SMR devices may render SMR devices capable of providing write or delete performance that meets of network-based data store 100 performance guarantees.

Retention-based data management may also allow for certain management operations, such as repairs to maintain data durability be performed more efficiently. For instance, durability models that may be used to define durability policies may be based on the notion of failure probability within a given time period. As the remaining time period for data with known retention times is available, the enforcement of a durability policy may be dynamically changed to suit the likelihood that failure will impact data with a certain amount of "live" time remaining.

Retention times for data to be stored in network-based data store may be determined in many ways. For example, retention time may be determined according to an indication of retention time provided in a request to store data received from a client. In some embodiments, retention rules may be applied to determine a retention time for data, which may be based on a knowledge-base, machine-learning, or user-specified retention policies for data.

Please note that previous descriptions are not intended to be limiting, but are merely provided as examples of retention-based management for persistent storage devices. Various other components or arrangements of components may make up a network-based data store to provide retention-based data management for network-based data stores. Data may also be placed differently according to different embodiments. For example, as discussed in FIGS. 7A and 7B below, different storage regions on a persistent storage device may be identified for storing data for a network-based data store.

This specification next includes a general description of a provider network, which may implement retention-based data management for network-based data stores, such as an object storage service. Then various examples of an object storage service are discussed, including different components, or arrangements of components that may be employed as part of implementing an object storage service. A number of different methods and techniques to perform retention-based data management for network-based data stores are then discussed, some of which are illustrated in accompanying flowcharts.

Finally, a description of an example computing system upon which the various components, modules, systems, devices, and/or nodes may be implemented is provided. Various examples are provided throughout the specification.

Figure 2:
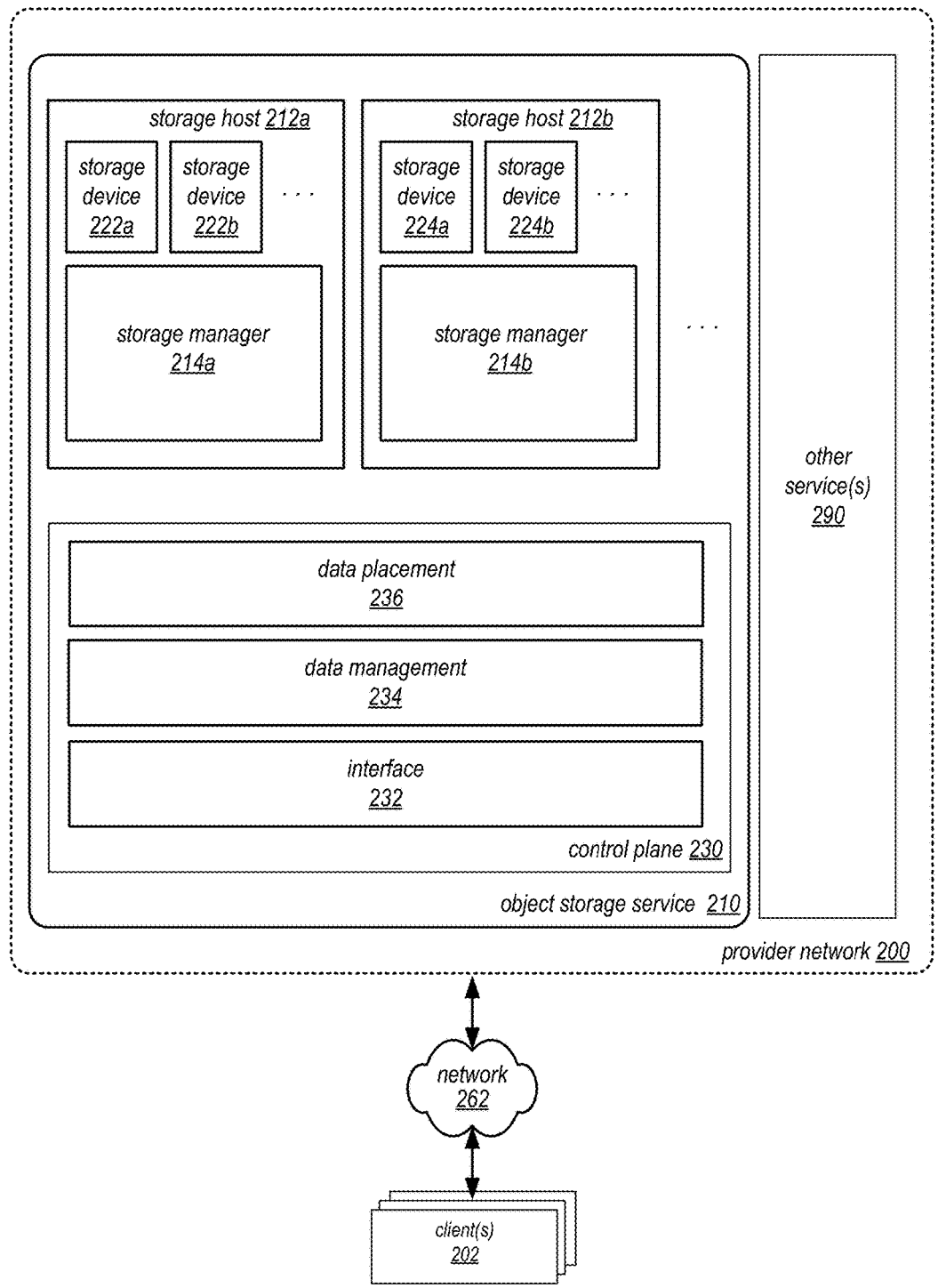
FIG. 2 is a logical block diagram illustrating a provider network that offers an object storage service that implements retention-based data management, according to some embodiments.

FIG. 2 is a logical block diagram illustrating a provider network that offers an object storage service that implements retention-based data management, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide virtual storage services, such as object storage service 210. Object storage service 210 may offer client(s) 202 virtual buckets in which to store one or multiple data objects.

In various embodiments, provider network 200 may implement object storage service 230 for performing storage operations. Object storage service 230 is a storage system, composed of a pool of multiple storage hosts 212*a*, 212*b*, and so on (e.g., server storage systems), which provide object storage for storing data at storage devices 222*a*, 222*b*, and 224*a*, 224*b* according to the object storage scheme discussed below in FIG. 3. Data buckets may be mapped to particular client(s) (e.g., a particular customer account of provider network 200), providing unstructured object storage (e.g., other persistent storage) for data objects which may be retrieved via object keys.

Figure 11:
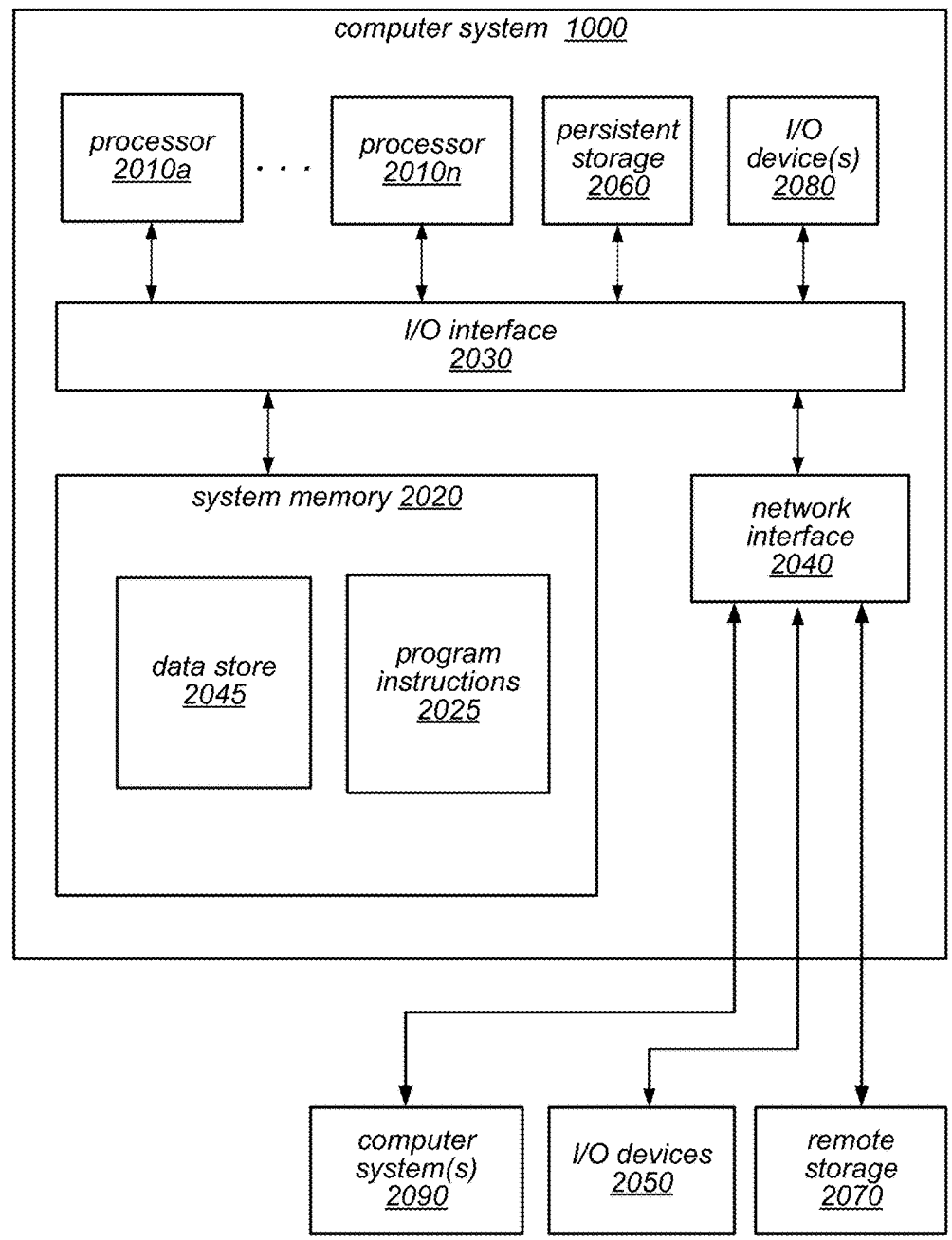
FIG. 11 is a block diagram illustrating an example computing system, according to some embodiments.

Storage hosts 212*a*, 212*b* may be one or more computing systems or devices, such as a storage server or other computing system (e.g., computing system 2000 described below with regard to FIG. 11). Each storage host may manage separate storage devices. Storage hosts may also provide multi-tenant storage. For example, in some embodiments, one storage host may maintain a data object (or portion of a data object) for one entity (e.g., a particular client or account of object storage service 230), while another data object maintained at the same storage host may be maintained for another entity (e.g., a different account). Storage hosts may persist their respective data objects in one or more persistent storage devices 222, 224 (e.g., hard disk drives, solid state drives, shingled magnetic recording (SMR) drives, etc.) that may be directly attached to a computing system or device implementing the respective storage host. Storage hosts may implement different persistent storage devices. For example, some storage hosts may implement solid state drives (SSDs) for persistent block storage, while other storage hosts may implement SMR drives or other magnetic-based persistent storage devices. In this way different specifications, and other performance characteristics may be provided according to the persistent storage devices implemented at the storage host.

Object storage service may manage and maintain data objects in a variety of different ways. Storage manager 214a, 214b, may be implemented at storage hosts 212a and 212b respectively to manage data stored in storage devices. Different durability schemes may be implemented for some data objects among two or more storage hosts as a partitioned, sharded, and/or replicated data object. Data may be maintained in data devices 222 and 224 in such a way as to provide security and privacy guarantees for client(s) 202. Storage managers 212 may enforce access policies for individual data objects or buckets, restricting access to data in data objects or buckets to those requestors that satisfy the access policy (e.g., by presenting appropriate identification or credentials). In this way, data stored in different data objects or buckets on the same storage host for different clients may be confidentially maintained so that an unauthorized request to access data may not be processed (even if the requestor has the right to access another data object or bucket hosted at the same storage host).

Object storage service 210 may implement control plane 230 to assist in the operation of object storage service 210. In various embodiments, control plane 230 assists in managing the availability of data objects and buckets to clients, for instance, by implementing the retention-based data management techniques described below with regard to FIGS. 4-10.

Control plane 230 may provide a variety of services related to providing object storage functionality, including the management of user accounts (e.g., creation, deletion, billing, collection of payment, etc.). Control plane 230 may further provide services related to the creation, usage and deletion of data buckets or objects in response to client requests. Control plane 240 may also provide services related to the collection and processing of performance and auditing data related to the use of data buckets or objects and snapshots or versions of those buckets or objects.

Clients 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at multi-tenant provider network 200 on behalf of a client 202.

Clients 202 may convey network-based services requests to provider network 200 via external network 262. In various embodiments, external network 262 may encompass any suitable combination of networking hardware and protocols necessary to establish network-based communications between clients 202 and provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 202 using a private network rather than the public Internet.

Figure 3:
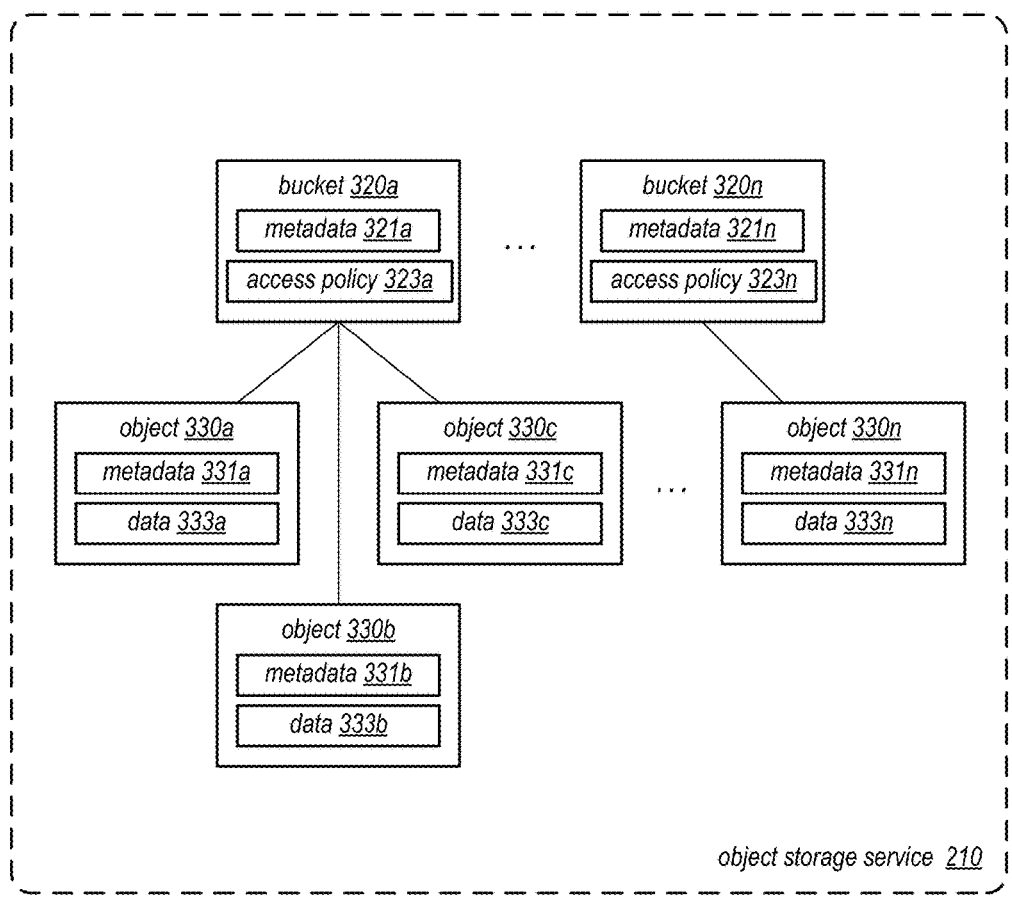
FIG. 3 is a logical block diagram illustrating an object-based storage scheme for an object storage service, according to some embodiments.

FIG. 3 is a logical block diagram illustrating an object-based storage scheme for an object storage service, according to some embodiments. Object storage service 210 may provide unstructured object storage model for providing virtualized storage resources to clients as a service, as illustrated in FIG. 2. In the illustrated model, storage service interface 232 provides a client-facing interface to object storage service 210. Storage service interface 232 may, for example, be implemented as, or alternatively may include, an application programming interface (API). According to the model presented to a client (e.g., clients 202 in FIG. 2) by interface 232, the storage service may be organized as an arbitrary number of buckets 320a-n accessible via interface 232 which may be hosted across storage hosts 222 and 224 in FIG. 2. Each bucket 320 may be configured to store an arbitrary number of objects 330a-n, which in turn may store data specified by a client of the storage service 210. One or more clients may submit requests to the storage service interface to store, retrieve, and, as described in more detail below, perform one or more operations on data object 330. Storage service interface may provide responses to the requests, which may include acknowledgements and/or retrieved data, for example. Generally, in addition to storage and retrieval of data objects, the requests or commands that the storage service 210 may perform may include commands that modify or update data within the storage service 210. In this way, the clients are not burdened with removing the data from the storage service 210, performing the operations, and then returning the modified data to the storage service. This configuration may save network bandwidth and processing resources for the clients, for example. In some embodiments, the object storage service 210 may be configured to internally replicate data objects for data redundancy and resiliency purposes.

In some embodiments storage service interface 232 may be configured to support interaction between the storage service 340 and its clients according to a web services model. For example, in one embodiment, interface 232 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In some embodiments, an object storage service 210 may provide read-after-write consistency for new data objects 330 when stored to the buckets 320. Read-after-write consistency for new objects 330 means that immediately after a write operation for a new object 330, the service 210 guarantees that the object 330 will be returned in response to a read operation. However, in some embodiments, an object storage service 210 may not guarantee that a new data object 330 will be immediately available for reads after a write operation. These embodiments thus provide eventual consistency for new data objects 330, rather than read-after write consistency.

In some embodiments, an object storage service 210 may provide eventual consistency for updates of existing objects 330 in the buckets 320. After an update operation is performed on an existing data object 330, it may take some period of time, generally seconds or minutes but possibly even hours or days, for the change to propagate to all instances of the data object 330. Thus, in some embodiments, the object storage service 210 may not guarantee that an access of a data object 330 stored in the storage service 210 will always return a latest or most recent version of the data object 330. This property of a storage service such as object storage service 210 may be referred to as eventual consistency, as a modified data object 330 is generally guaranteed to be only eventually consistent across all instances.

Figure 4:
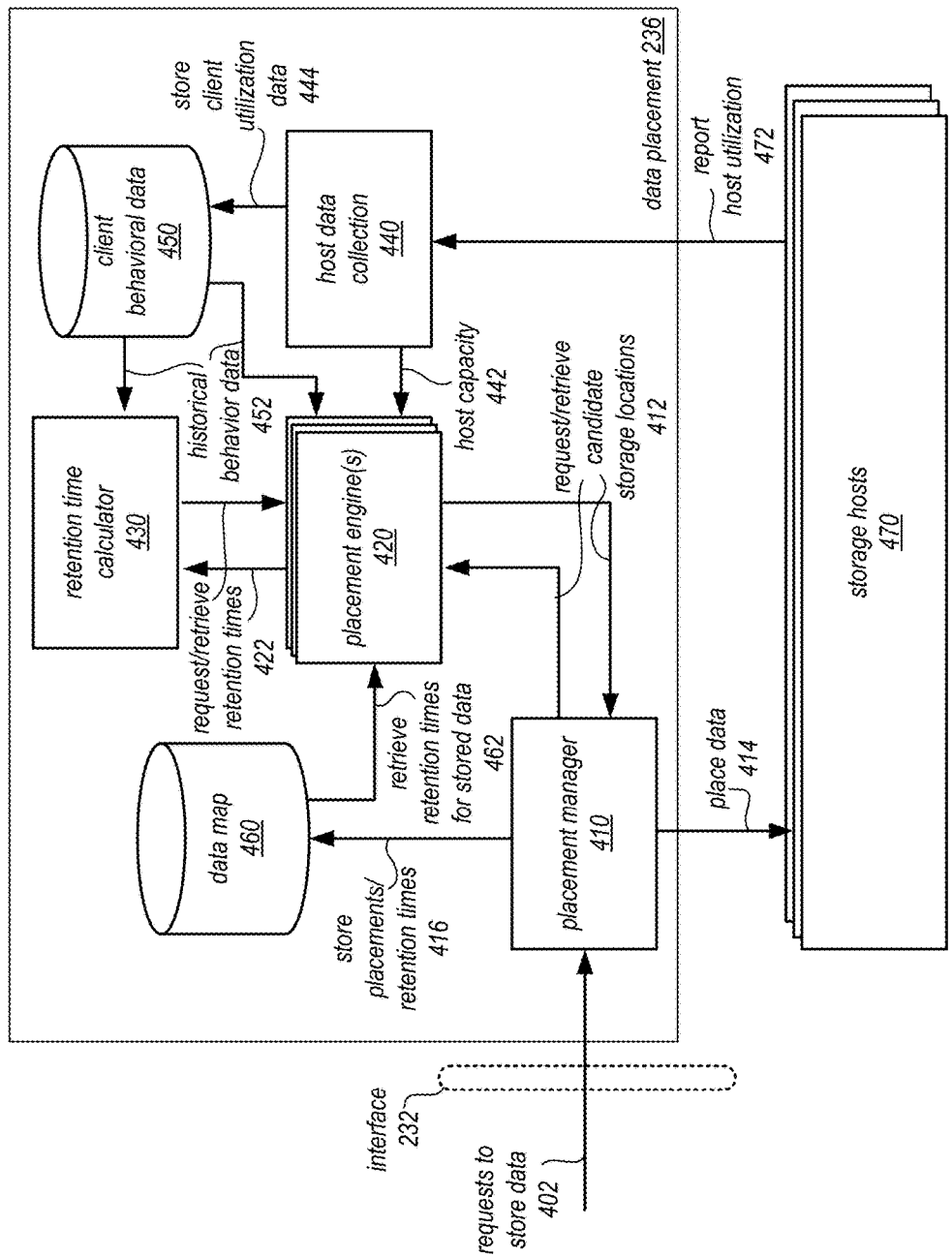
FIG. 4 is a logical block diagram illustrating data placement for an object storage service according data retention times, according to some embodiments.

FIG. 4 is a logical block diagram illustrating data placement for an object storage service according data retention times, according to some embodiments. Requests to store data 402 may be received at data placement 236 via interface 232, indicating data to be stored. Data placement 236 may then determine a placement location, based at least in part on a retention time determined for the data and direct placement of the data at one or more storage hosts 470 for storage.

In some embodiments, the requests 402 may be processed by placement manager 410, which may be implemented as part of data placement 236. For a request 402, placement manager 410 may send a request for candidate storage location(s) 412 to placement engine(s) 420. In some embodiments, requests may indicate a retention time for the data, in which case placement manager 410 may parse or obtain the retention time from the request 402 and include in the retention time in the request 412 to placement engine(s) 420 for consideration.

In some embodiments, data placement 236 may implement placement engine(s) 420 to determine/identify candidate storage locations for placing data objects on persistent storage devices hosted at storage hosts 440. In at least some embodiments, multiple placement engine(s) 420 (or versions of placement engines) may be implemented by data placement 236, some of which may be specified according to a client-specified placement policy and/or control plane placement policy. Consider the example where a client wishes to store data objects at a reduced durability level (than the default durability guaranteed by object storage service 210). A placement engine 420 may be utilized to determine candidate storage locations for data objects submitted by the client, which evaluates placement according to the reduced durability level.

Placement engine(s) 420 may make placement decisions according to a variety of data, obtained from different sources. For example, in at least some embodiments, data placement 236 may implement host data collection 440 to collect capacity, availability, (and other host utilization information for placement decision making) in order to provide host capacity 442 (among other data) to placement engine(s) 420. For instance, host data collection 440 may periodically poll storage hosts 470 to report host utilization 472 to host data collection 440 to identify those hosts 470 with sufficient storage space to store the data object (or portion of the data object, such as a shard of the data object). Some of the collected host utilization data may be specific to or apportioned to the utilization of a stored data objects by a client (or customer account). Thus, host data collection 440 may also store client utilization data 44 as part of client behavioral data 450, in some embodiments.

Figure 6:
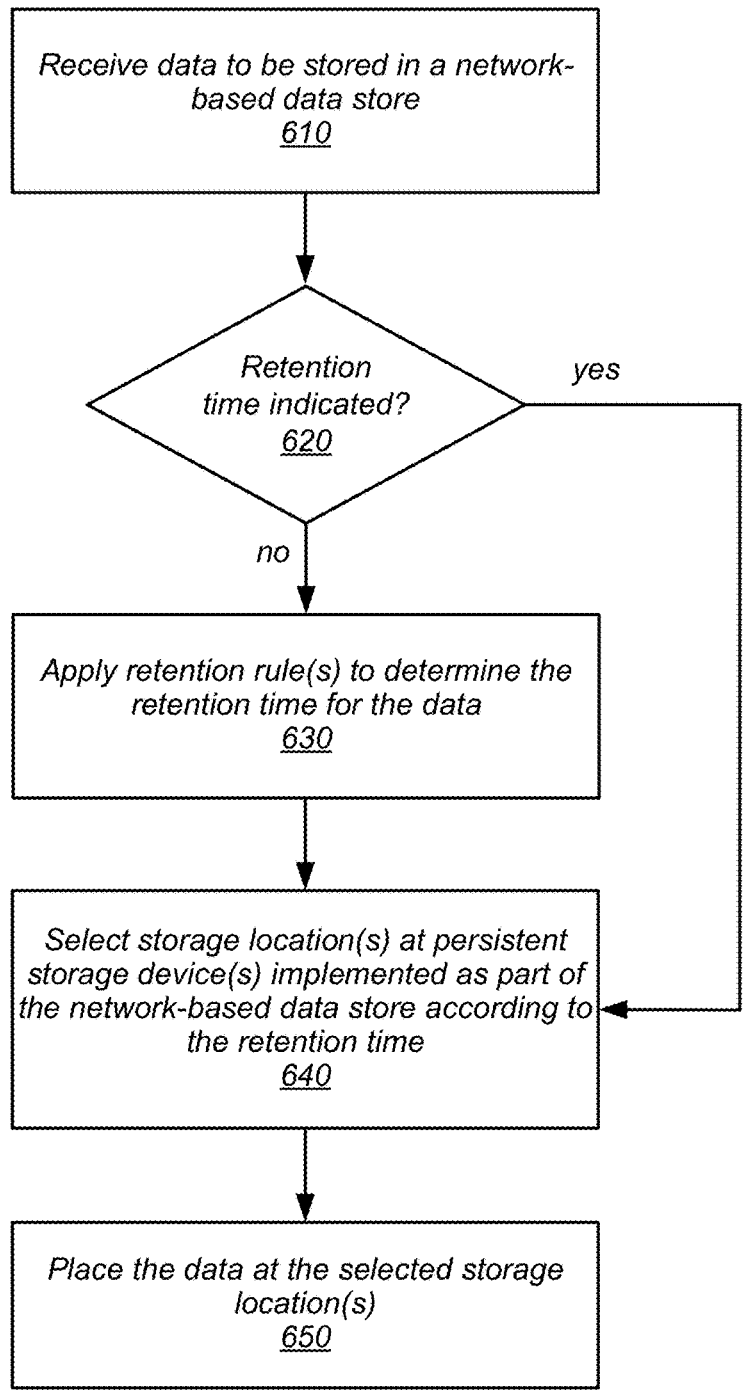
FIG. 6 is high-level flowchart illustrating various methods and techniques for placing data in a network-based data store according to a retention time, according to some embodiments.
Figure 7A:
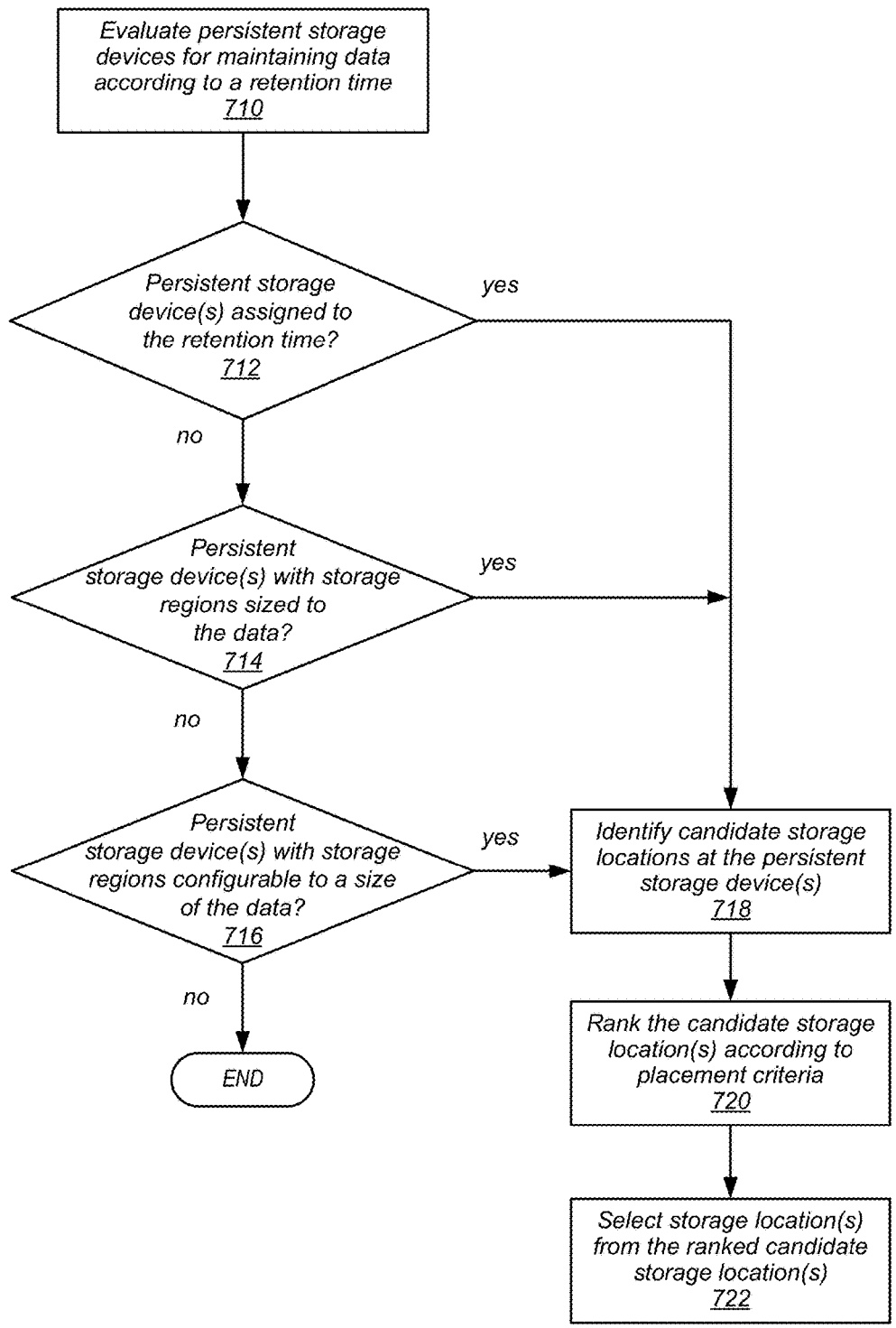
FIG. 7A is a high-level flowchart illustrating various methods and techniques for selecting storage locations at persistent storage devices according to a retention time, according to some embodiments.
Figure 7B:
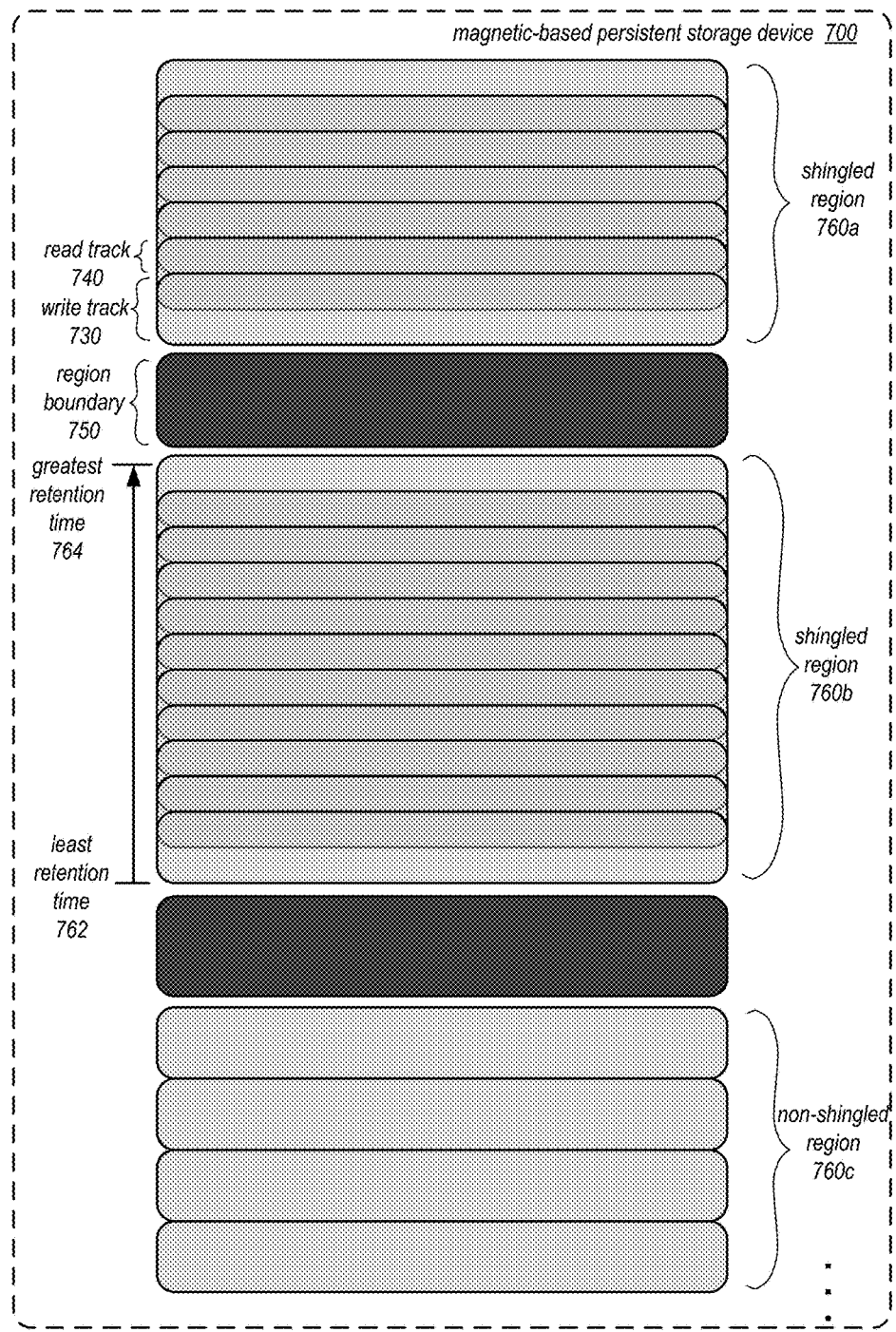
FIG. 7B is a logical block diagram illustrating a magnetic based persistent storage device for performing retention-based management techniques, according to some embodiments.

For placement decisions, placement engine(s) 420 may also determine candidate storage locations according to a determined retention time for the data to be placed, as discussed below with regard to FIGS. 6-7B. In at least some embodiments, data placement 236 may implement retention time calculator 430. Retention time calculator 430 may determine a retention time for data to be stored (even if the request included a client-specified retention time, in some embodiments). For instance, retention time calculator may apply one or more retention rules to determine whether the data is to be stored. Retention rules may be user-specified (e.g., associated with a client that sent the data to be stored or customer account associated with the client that sent the data to be stored) or may be specified by the object storage service (e.g., retention time limits or learned rules based on historical data for predicting retention time). Retention rules may, in some embodiments, be categorized according to the type, size, format, and/or any other characteristic of the data to be stored in the network-based data store. In at least some embodiments, a request to send the data may indicate characteristics used to select the retention rules to apply (e.g., customer identifier, data type, data size, etc.). Retention rules may also be created and applied as part of a knowledge base collected from storing other data. For example, machine learning techniques may be applied to evaluate historical data, such as historical behavior data 452 obtained from client behavioral data 450, to identify features with varying degrees of selectivity that indicate the retention time for the data. Once determined, the retention time calculated for data to be stored may be returned 422 to placement engine(s) 420.

In at least some embodiments, placement engine(s) 420 may retrieve retention times for data that is already stored 462 for consideration for placement. Consider the techniques discussed below with regard to FIG. 7B, where data may be preferably placed at a storage location that overlaps data stored for a greater or longer retention time than the data being placed. Retrieved retention times 462 may be utilized by placement engine(s) 420 to determine whether or not a potential placement overlaps data with a longer retention time. Placement engine(s) 420 may also use historical behavior data 452 for customers as part of placement decision-making. Consider the scenario, where a customer is known to modify multiple similar data objects together. If the request 402 can be evaluated at placement engine(s) 420 as one of the similar data objects, then the placement decision may be made to locate the data object in underlying physical storage near the other similar data objects so that modification can be performed at a similar time.

Placement engine(s) 420 may select storage locations as candidate placement locations for placing data in many ways. For instance, placement engine(s) 420 may recommend candidate storage locations that may place data at storage hosts with persistent storage devices assigned to hosting data that are assigned to store data with the determined retention time (e.g., a range of retention times as illustrated in FIG. 1), or to hosts with persistent storage devices that have storage regions available sufficient to store the data without other data (as discussed below with regard to FIG. 7A). Other placement criteria may be used, in various embodiments, to rank candidate storage locations for placement, including various information provided to placement engine(s) 420, as discussed above. Placement criteria may include performance characteristics, such as I/O operations per second (IOPS) capabilities of persistent storage devices may be evaluated, type of storage devices (e.g., traditional hard disk drive, SMR device, or flash-based storage device (e.g., solid state drives), and/or physical device locations (e.g., storage hosts, networking equipment, server racks, and other system components that are used to communicate with the persistent storage devices), in some embodiments. As noted earlier, different placement engine(s) 420 (or different placement policies within placement engine(s) 420) may provide different candidate storage locations 412 for different requests 402. FIGS. 6-7B discussed below provide many different examples of placement techniques that may be implemented at placement engine(s) 420.

Once candidate storage locations are retrieved 412, placement manager 410 may select candidate storage locations for storing the data. For instance, if the data object is to be sharded, partitioned, or otherwise stored in multiple locations, placement manager 410 may select the number of storage locations needed from the candidate storage locations. In at least some embodiments, the request for candidate storage locations 412 may specify a number of candidate storage locations to provide. Placement manager 410 may then place the data 414 (or configure connections between clients and hosts 470 to place the data) at the selected storage locations at storage hosts 470. In at least some embodiments, placement manager 410 may encode, encrypt, compress, or otherwise modify the data according to the retention time for the data, in some embodiments. For example, for data store for longer retention times, more complex encryption or greater compression may be applied. In some embodiments, placement manager 410 may store placements and determined retention times to data map 460 to track the placement of data, along with other metadata describing the data, such as retention times. Thus, retention times may be retrieved from data map 460 to perform various other retention-based management actions, as discussed below with regard to FIG. 5.

Figure 5:
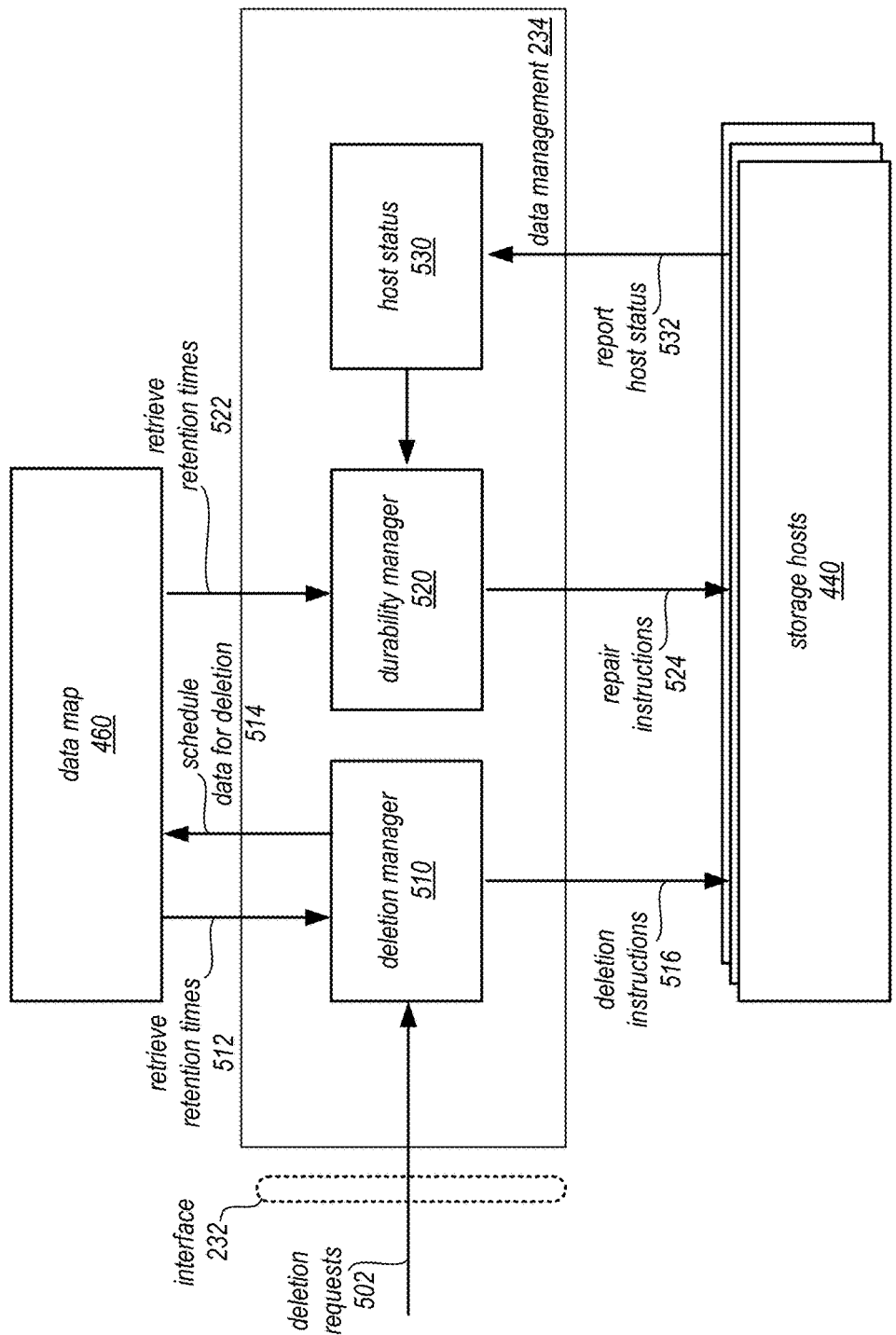
FIG. 5 is a logical block diagram illustrating data management including data deletion and repair according to data retention times, according to some embodiments.

FIG. 5 is a logical block diagram illustrating data management including data object deletion and repair according to data retention times, according to some embodiments. Deletion requests 502 may be received at data management 234 via interface 232, indicating the data object to be deleted. Data management 234 may, in various embodiments, implement deletion manager 510 to optimize the performance of deletions according to retention times for data. For example, as indicated at 512, retention times 512 may be retrieved by deletion manager 510 from data map 460. For instance, the retention times for other data located at the same persistent storage devices may be retrieved in order to determine whether or not deletion should be delayed, such as described below with regard to FIG. 8. A cost benefit analysis may be performed, for example, to identify the efficiency of maintaining data for which a deletion request is received versus deleting the data. Some deletion requests may be performed at a later time, and deletion manager 510 may schedule the data for deletion 514 in data map 540, indicating a particular time at which the data should be deleted (or condition triggering deletion of the data). For instance, the data map 460 may be subsequently evaluated for other deletion requests that are received with respect to data that is co-located with the data, and a determination may be made that a deletion condition, all data objects stored in particular region or portion of a persistent storage device have been scheduled for deletion, is met. Deletion may be performed by deletion manager 510 in response to detecting the satisfied condition. Deletion requests 502 that are not delayed, or later performed as part of a batch process by deletion manager 510, may be included in deletion instructions 516 provided to storage hosts 440, in some embodiments.

Data management 234 may also implement durability manager 520 to enforce durability policies for data objects maintained in object storage service 210. For example, storage hosts 440 may report host status 532 (e.g., in response to a polling request for health by host status 530). Host status 530 may collect host status information and trigger warnings when replicas fail or become unavailable (e.g., due to network partition). Host status 530 may indicate to durability manager 520 unavailable replicas. Durability manager 520 may determine whether to perform repair operations. For instance, durability manager 520 may evaluate a retention time 522 for the data with unavailable replicas, as discussed below with regard to FIG. 9. If the durability policy can still be satisfied with less replicas (e.g., by comparing the probability that the data with the remaining live replicas will be lost with the retention time of the data), then no repair operation may be performed. However, for scenarios where repair operations may be necessary, durability manager 520 may send repair instructions to storage hosts 440 to create new replicas of the data to satisfy the durability policy.

Please note that the interactions discussed above in FIGS. 4 and 5 with regard to performing retention-based management of data network-based data stores are examples. Various other systems, components, and/or devices may be added or removed.

The examples of implementing retention-based data management for network-based data stores as discussed above with regard to FIGS. 2-5 have been given in regard to an object storage service offered by a provider network. Various other types or configurations of network-based data stores may implement these techniques. FIG. 6 is high-level flowchart illustrating various methods and techniques for placing data in a network-based data store according to a retention time, according to some embodiments. Various ones of the systems described above may implement some or all of these techniques.

As indicated at 610, data may be received to be stored in a network-based data store. The data itself may be received subsequent to a request to upload data or may be included as part of a request to upload the data. The request may be formatted according to a network-based interface for the data store, as discussed above with regard to FIGS. 2-5. In at least some embodiments, the request may indicate a retention time for the data, as indicated at 620. The data retention time may be indicated as particular time to live (TTL), such as particular year, month, day, hour, minute, second, or may provide a time frame or condition from which a retention time may be derived, such as 1 year, 2 months, 10 days, or 48 hours.

If no retention time is indicated, then one or more retention rule(s) may be applied to determine the retention time for the data, as indicated at 630. Retention rules may be user-specified (e.g., associated with a client that sent the data to be stored or customer account associated with the client that sent the data to be stored) or may be specified by the network-based data store. Retention rules may, in some embodiments, be categorized according to the type, size, format, and/or any other characteristic of the data to be stored in the network-based data store. In at least some embodiments, a request to send the data may indicate characteristics used to select the retention rules to apply (e.g., customer identifier, data type, data size, etc.). Retention rules may also be created and applied as part of a knowledge base collected from storing other data. Machine learning techniques may evaluate historical data retention types with respect to the different characteristics and may be used to identify features with varying degrees of selectivity that indicate the retention time for the data. Retention rules may be generated that utilize the selected features identified based on the machine learning techniques to determine the retention time for the data.

As indicated at 640, storage locations may be selected at persistent storage device(s) implemented as part of the network-based data store according to the determined retention time. FIGS. 7A and 7B, discuss selection of storage locations in greater detail below. For example, storage locations may be selected according to evaluating the retention period with respect to placement criteria, identifying persistent storage devices with an assigned retention time equal or similar to the retention time for the data, for example. Storage locations may also be selected by identifying regions within persistent storage devices, such as SMR devices, that may store the entire data alone (e.g., without data for any other data object in the same region). In at least some embodiments, storage regions may be allocated, configured, formatted, or assigned which are sized to the data such that the entire data is stored without data for any other data object. Consideration may also be paid to the potential location that the data may be written within shingled magnetic recording (SMR) devices. For example, the retention times for other data which would be overlapped by the data may be considered. In some embodiments, storage locations may be selected at storage regions in SMR devices so that data is written to overlap portions of other data with a longer retention time.

Once selected, the data may be placed at the selected storage locations, as indicated at 650. The data, for example, may be sent to storage nodes, or other systems o hosts that manage access to the persistent storage devices including the storage locations in order to write the data to the storage location(s). Please note, that in at least some embodiments, data may be stored in multiple replicas to satisfy a durability policy as discussed below with regard to FIG. 8. Moreover, data may be sharded or partitioned in order to securely and/or efficiently encode the data (e.g., using erasure encoding or identity encoding). In at least some embodiments, modifications to the data may be performed based on the retention time. For instance, different types of encryption, compression, or other reformatting of data may be performed prior to placing the data at the selected storage location(s).

FIG. 7A is a high-level flowchart illustrating various methods and techniques for selecting storage locations at persistent storage devices according to a retention time, according to some embodiments. As indicated at 710, persistent storage devices of a network-based data store may be evaluated for maintaining data according to a retention time. In at least some embodiments, some persistent storage devices may be assigned to storing data that is specific to the retention time (or a range of retention times that includes the retention time as illustrated in FIG. 1), as indicated at 712. Such persistent storage devices may be considered for storing data that fits within the assigned retention times. In at least some embodiments, mapping information or a heuristic (e.g., a hashing scheme) may be utilized to identify which persistent storage devices store data with particular retention times.

As indicated at 714, persistent storage device(s) may be evaluated for storage regions sized to the data, as indicated at 714. Storage regions may be implemented as part of magnetic-based persistent storage devices. FIG. 7B is a logical block diagram illustrating a magnetic based persistent storage device for performing retention-based management techniques, according to some embodiments. Magnetic based persistent storage device 700 may be a hard disk drive or other magnetic recording medium that records data that is readable by computing devices. Disk-based magnetic recording devices may implement storage regions, such as storage regions 760 in FIG. 7B which are collection of data tracks that magnetically store and represent data to be read or written along the track. Writing to or reading from data stored in one region may have no effect on data stored in a different region, in some embodiments.

Typically, magnetic-based persistent storage devices have included non-shingled regions or tracks. As non-shingled region 760c illustrates in FIG. 7B, each of the four data tracks in the region are non-overlapping (or non-overlapping enough such that writing to one track does not render the data in another track invalid). Shingled regions, however, such as shingled regions 760a and 760b may overlap write tracks so that a narrower read track is available to read data of the partially overwritten track. As indicated at 730, a write track is wider than a read track 740. Writing mechanisms (e.g., heads) on magnetic-based storage are generally wider than reading mechanisms. Thus, only a smaller track of data needs to be retained in order to be read. Overlapping write tracks to provide narrow strips of preceding tracks for reading allows data to be written in a more condensed fashion. Devices capable of implementing such singled techniques are often referred to as Shingled Magnetic Recording (SMR) devices. Thus, in at least some embodiments, magnetic-based persistent storage device 700 may be an SMR device (as may be storage devices 222 and 224 in FIG. 2).

When data stored in a shingled region is modified, such as data stored in read track 740, data that overlapped the track (write track 730) may be overwritten. Thus, in order to modify track 740, data in the "blast radius" or the track portion overlapping track 740 may be overwritten by the wider write mechanism. Such writes (or deletions) may require that all of the data is overlapping the track, and subsequent data which overlaps the overlapping track and so on (until reaching a region boundary 750 or outside edge of the disk) may have to be read from the disk and written again in order to recreate the shingled pattern of tracks. A region boundary 750 may provide a recognizable portion of the magnetic recording surface which delineates different storage regions.

Thus, in at least some embodiments, locations to store data in SMR devices may be chose according to the retention period. For instance, in shingled region 760b, data that is stored with the greatest retention time 764 may be stored higher or further in to the disk, whereas data that has the least retention time 762 may be stored lower. Therefore, when performing a write or deletion of data in shingled region 760, there is a greater likelihood that data stored in tracks in the blast radius (e.g., below the location of a write or delete) may no longer need to be retained according to the data retention time for the data in the affected tracks. Please note that FIG. 7B is just provided as an example of magnetic-based persistent storage device and is not intended to be limiting. Some magnetic-based persistent storage devices may only provide shingled or non-shingled regions, while others, as illustrated in FIG. 7B, may include both types of regions. In at least some embodiments, regions may include different numbers of tracks. Additionally, the number of tracks in a region may be configurable, in some embodiments.

Turning back to FIG. 7A, regions may be evaluated at persistent storage device(s) to determine whether a region exists that is sized to the data. For example, a region sized to the data may be a region large enough (e.g., enough data tracks) to store all of the data without storing other data. Thus, the region may be equivalent or near equivalent to the size of the data to be stored, in some embodiments. As indicated at 716, in at least some embodiments, persistent storage device(s) may provide regions which may be configurable to a size of the data, in various embodiments. For instance, a persistent storage device may allow commands to be sent that trigger a region construction or configuration operation to modify the region size to an indicated number of data tracks.

Candidate storage locations may be identified at the persistent storage devices identified at elements 712, 714, and/or 716, in various embodiments. For instance, a candidate storage location may include a specific location (e.g., range of bytes or location within track(s) on a device) which may hold the data to be stored. The candidate storage location(s) may be ranked according to placement criteria, as indicated at 720, in various embodiments. Placement criteria may include a schema which rates some storage locations as more optimal than others. For instance, storage regions sized to data may be ranked higher than persistent storage devices that stored multiple different sets of data with the same data retention time. Other placement criteria in addition to the information discussed above at 710, 720 and 730 may be included for ranking as well. Performance characteristics, such as I/O operations per second (IOPS) capabilities of persistent storage devices may be evaluated, type of storage devices (e.g., traditional hard disk drive, SMR device, or flash-based storage device (e.g., solid state drives), and/or physical device locations (e.g., storage hosts, networking equipment, server racks, and other system components that are used to communicate with the persistent storage devices) may also be evaluated, in some embodiments. A placement score may be generated for the different candidate storage locations to indicate the ranking, in some embodiments.

As indicated at 722, storage location(s) may be selected according to the rankings, in various embodiments. For example, placements may be attempted at the highest ranked locations (according to the number of replicas needed to be created) in some embodiments. If a placement fails at a particular storage location, then a next best storage location may be selected from the rankings and attempted, and so on.

Please note that various example ways to identify storage locations may be performed in different or parallel orderings along with other evaluations not illustrated. Thus the previous examples are not intended to be limiting as to other techniques for selecting storage locations according to a retention time for data to be placed.

Figure 8:
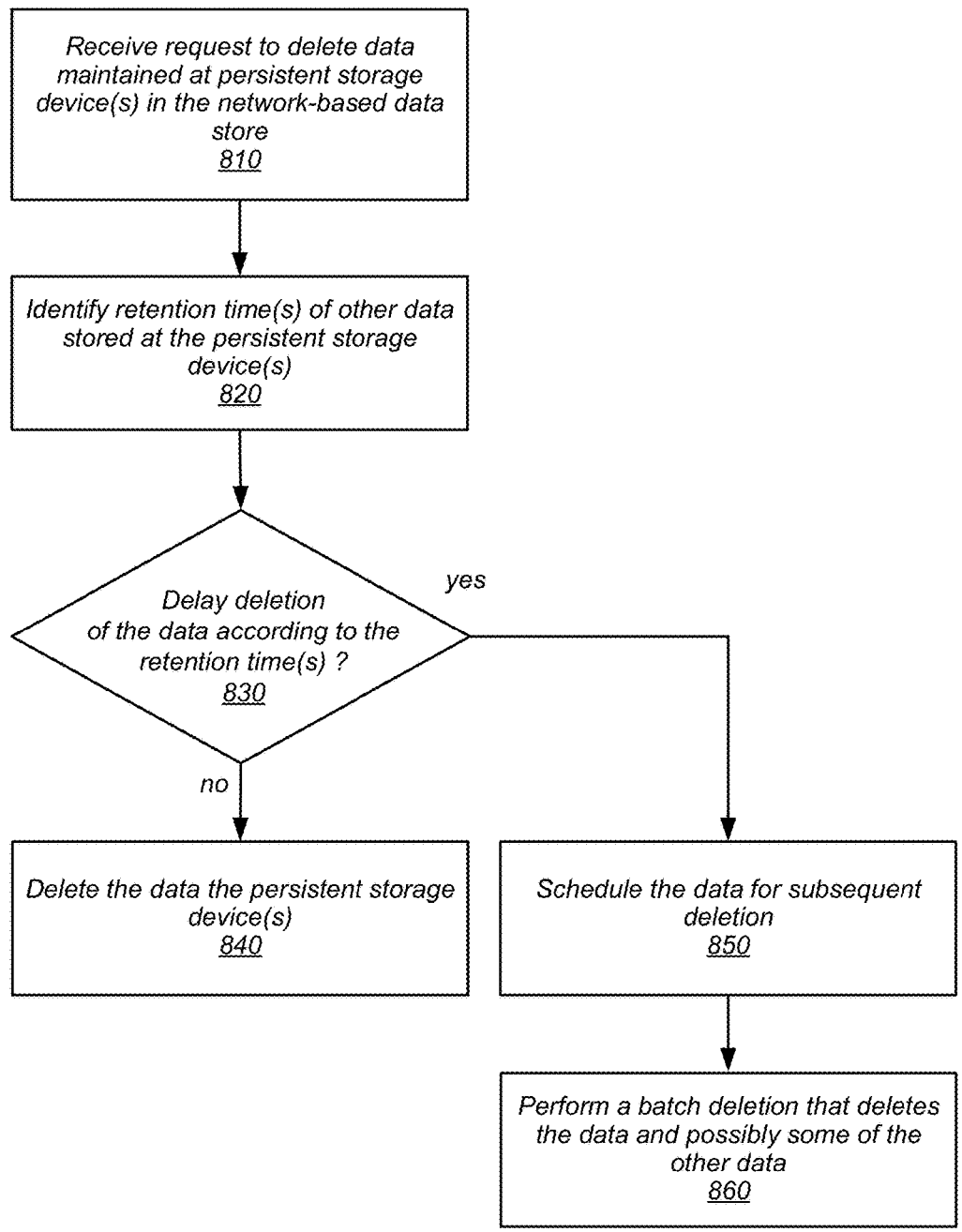
FIG. 8 is a high-level flowchart illustrating various methods and techniques for deleting data based on a retention time, according to some embodiments.

Deleting data maintained at persistent storage device(s) in a network data store can be a costly operation. For example, if shingled magnetic recording devices, such as those discussed above with regard to FIG. 7B, are implemented as the persistent storage devices, random writes or deletes may trigger expensive reading, deleting, and recopying operations to rewrite data that is to be deleted. As with the placement techniques discussed above in FIGS. 1 and 6-7B above, combining delete operations to remove different data may allow for the penalty cost of deleting (e.g. particularly in SMR devices) to be shared amongst the delete requests, instead of a single delete request. FIG. 8 is a high-level flowchart illustrating various methods and techniques for deleting data based on a retention time, according to some embodiments.

As indicated at 810, a request may be received to delete data maintained at persistent storage device(s) in the network-based data store, in some embodiments. The delete request, for instance, may delete data prior to (or after) a data retention time identified for the data. The data may be stored at persistent storage device along with different data (e.g., data stored for a same client or for different clients in a multi-tenant scheme). As indicated at 820, retention time(s) of other data stored at the persistent storage device(s) may be identified. A metadata store or repository may maintain the retention times, or the data itself may include metadata describing the retention time for data.

Based, at least in part, on the identified retention time(s) for the other data, a determination may be made as to whether the deletion should be deleted according to the retention time(s), as indicated at 830. For instance, a cost-efficiency calculation may be made. Consider the scenario the data to be deleted consumes 20% of a storage region at an SMR device. The remaining 80% of the data in the storage region still needs to be maintained (at a current time). Thus, depending on the location of the deleted data in the region, the deletion operation may, at worst require that 80% of the data be read from the storage region and rewritten to the storage region after removing the data to be deleted. An efficiency score may be generated which does not exceed an efficiency threshold (above which it is determined to be efficient to perform the deletion). Moreover, if within 2 days after the current time, another 60% of the data need no longer be retained (as indicated according to the data retention time), then the efficiency score to perform the deletion operation may exceed the efficiency threshold. Thus, a determination may be made to delay deletion of the data according to the retention time(s), as indicated at 830.

Delayed deletions may be scheduled, or otherwise identified for subsequent deletion, as indicated at 850. For example, a tombstone or other deletion marker may be included in metadata describing the data (e.g., at a data map or within metadata stored in the data itself), which when read indicates that the data is no longer to be considered available for I/O access to clients of the network-based data store. As indicated at 860, in some embodiments, a batch deletion operation may be performed that deletes the data and possibly some of the other data co-located with the data, in various embodiments. Consider the example given above. Once enough data is either scheduled for deletion by a deletion request or available for deletion due to the expiration of retention time for the other data, the efficiency score of the persistent storage device may be sufficient to exceed the efficiency threshold and trigger the performance of a deletion at the persistent storage device to remove data marked for deletion or data that no longer need be retained due to retention time. Less data may need to be rewritten to the persistent storage device (and remaining data may be recombined or relocated to different storage devices in some embodiments). Alternatively, it may be that just the data itself is deleted, but that the deletion is delayed until such a time that the cost of resources to perform the deletion (e.g., I/O bandwidth at an SMR device) does not impact the performance of other tasks (e.g., perform the deletion during off-peak time). If, no delay is necessary, as indicated by the negative exit from 830, then the data may be deleted from the persistent storage device(s). For instance, if the data is the only data in an entire storage region at the persistent storage device(s) or exceeds the efficiency threshold, then the deletion may be performed.

Please note that similar techniques to those described above with regard to deleted requests may be performed with write requests. Write requests may be received and if no suitable placement location is found, buffered and delayed until such a time as a batch write request may be performed (along with other data to be written to a persistent storage device according to the retention times of the data and the other data).

Figure 9:
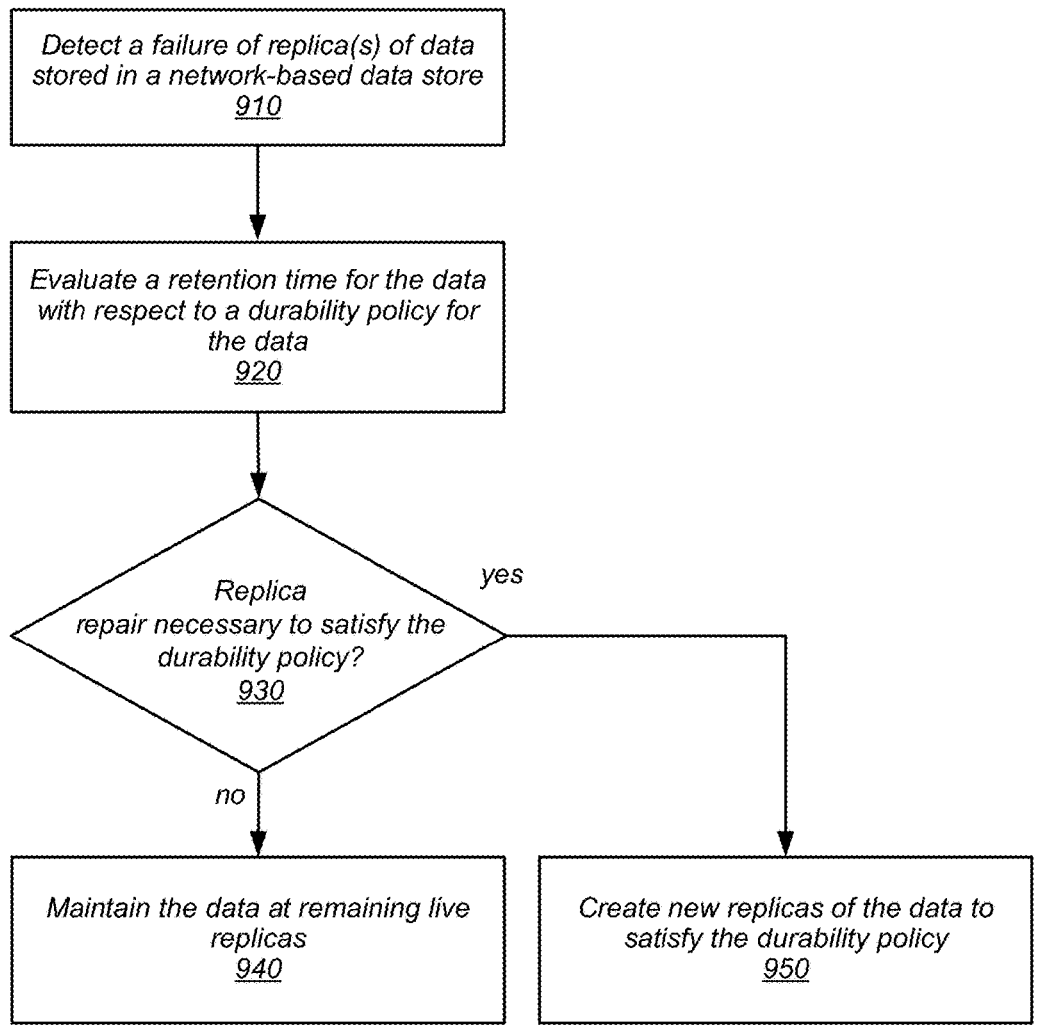
FIG. 9 is a high-level flowchart illustrating various methods and techniques for repairing data based on a retention time and durability policy, according to some embodiments.

Network-based data stores may maintain data stored in the data store in multiple different replicas in order to provide greater durability and availability for data stored therein. Durability policies may be established which identify the conditions in which the replicas that are online or live are sufficient to provide a required level durability for the data. However, enforcing durability policies often drives significant network traffic and utilizes large portions of processing and I/O bandwidth to recover or repair when replica failures occur so that a durability policy is satisfied. FIG. 9 is a high-level flowchart illustrating various methods and techniques for repairing data based on a retention time and durability policy, according to some embodiments.

As indicated at 910, a failure of replica(s) of data stored in a network-based data store may be detected. A storage node, or other system or host managing persistent storage devices for the network-based data store may fail to respond to a health check or polling request for status by a control plane. In some embodiments, the storage node may send out some kind of failure indication, error message, or distress call to indicate failure of a replica of data. Once detected, a retention time for the data may be identified. A central metadata store or repository for the network-based data store may store retention times for the data. In some embodiments, other live replicas of the data may store the retention time (as well as other metadata) for the data along with the replica of the data.

The retention time for the data may be evaluated with respect to the durability policy for the data, as indicated at 920, in some embodiments. For instance, the durability policy may guarantee a particular survivability rate (e.g., 99.999% durable or 0.001% failures). The number of replicas to satisfy the survivability rate may be determined based on historical data (e.g., actuary tables for persistent storage device and/or network-based storage service failures) which indicate a number of replicas necessary to provide the survivability within a period of time. 10 replicas of data in different locations (e.g., data centers) may provide 99.999% durability as the chances of all 10 replicas failing within 1 month are 0.001%. Evaluating the retention time with respect to the durability policy for the data may allow for the number of replicas to guarantee survivability to change depending on the amount of time remaining. If, for instance, for data within only 1 more day remaining to be retained, as indicated by the data retention time for the data, and 2 replicas fail, there may be only a 0.000001% probability that the remaining 8 replicas will fail. Thus, the durability policy may not require the 2 replicas to satisfy the durability guarantee of 99.999% (as 1-0.000001% is 99.999999, which is greater than 99.999%). Thus, as indicated by the negative exit from 930, in such scenarios where replica repair is not necessary to satisfy the durability policy according to the evaluation, then the data may be maintained a remaining live replicas without performing any repairs or creating new replicas of the data, as indicated at 940. However, if the evaluation determines that a replica repair is necessary to satisfy the durability policy, then new replicas of the data may be created to satisfy the durability policy, as indicated at 950. Please note that in at least some embodiments, a client or user of the network-based data store may specify a durability policy for the data (e.g., in addition to or instead of a data retention time) in a request to store the data. Alternatively, the network-based data store may provide a minimum durability policy for all data stored at the network-based data store, in some embodiments.

Figure 10:
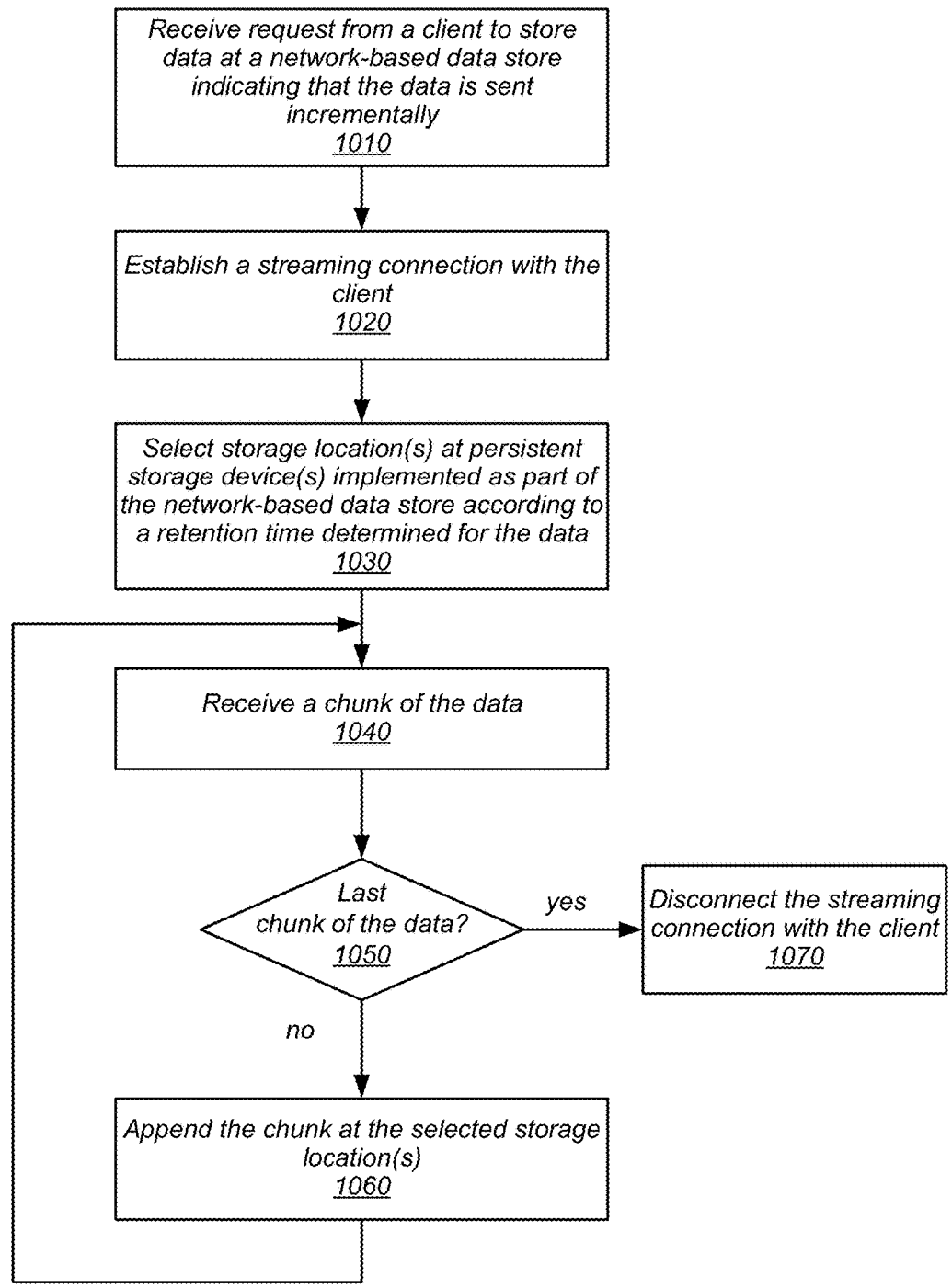
FIG. 10 is a high-level flowchart illustrating various methods and techniques for storing a stream of data at storage locations determined according to data retention times, according to some embodiments.

While some data that is received and stored at a network-based data store is generated at a single point in time, some data is generated incrementally. For example, daily sales data or daily network traffic data may be incrementally collected throughout a day to generate daily total values (e.g., total sales, total visitors, etc.). In at least some embodiments, a network-based data store may provide a streaming connection to allow such data to be incrementally uploaded to a network-based data store (e.g., as a single data object). FIG. 10 is a high-level flowchart illustrating various methods and techniques for storing a stream of data at storage locations determined according to data retention times, according to some embodiments.

As indicated at 1010, a request may be received from a client to store data at a network-based data store that indicates that the data is sent incrementally. For example, the network-based data store may implement an API command or format (e.g., including a particular flag, value, or keyword in the request) which indicates that the request is to send data in streaming fashion. Incrementally sending or streaming the data may be performed by sending a series of communications that include data chunks from the data that is being sent to the network-based data store. The data chunks may be sent as they are generated, in a least some embodiments, and may be of a similar (e.g., 256 kB chunks) or different size relative to other data chunks.

As indicated at 1020, a streaming connection may be established with the client, in some embodiments. For example, various streaming and other communication protocols may be implemented to incrementally receive data chunks of data from a client at the network-based data store (e.g., File Transfer Protocol (FTP), Trivial FTP (TFTP), Secure FTP (SFTP), etc.). Once the streaming connection is established, retention time may be determined according to an indication of retention time provided in the request, at 1010, or may be determined by applying various retention rules, which may be based on a knowledge-base, machine-learning, or user-specified retention policies for data, as discussed above at FIG. 6.

Storage locations(s) may be selected at persistent storage device(s) implemented as part of the network-based data store according to a retention time determined for the data, as indicated at 1030. For example, as also discussed above with regard to FIGS. 7A and 7B, selection of the storage locations at the persistent storage device(s) may be performed in many ways. For example, data chunks may be implemented as part of a larger data object that is sharded or partitioned into multiple different portions which may be separately maintained for security and durability purposes. Erasure encoding or identity encoding, for example, may be performed to store the data chunk in multiple different portions (or as part of multiple different portions). Storage locations may be selected according to evaluating the data retention period with respect to the same placement criteria as discussed above, such as identifying persistent storage devices with an assigned retention time equal or similar to the retention time for the data chunk. Storage locations may also be selected by identifying regions within persistent storage devices, such as SMR devices, that may store the entire data object, determining whether space exists at the storage location to append additional chunks the data object in addition to a first chunk of the data object. In at least some embodiments, storage regions may be allocated, configured, formatted, or assigned which are sized to the data object (or larger portion of the data allowing for space to append subsequent data chunks) such that the entire data object is stored in the region. Note that in some embodiments, different retention times may be determined for different data chunks of the data object.

The network-based data store can begin receiving data chunks from the client, as indicated at 140. If the data chunk is not the last chunk of the data, as indicated by the negative exit from 1050, then the data chunk may be appended to the selected storage locations, as indicated at 1060. For example, the data chunk may be sent to storage host(s) that manage the persistent storage device(s) that include the selected storage location(s). The storage host(s) may then write the data chunk to the selected storage location(s) according to the order in which the data chunks are received. As indicated by the loop back to element 1040, data chunks may be received and placed until the last chunk of the data is received. If the last data chunk is received, then as indicated at 1070, the streaming connection with the client may be disconnected, in some embodiments.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of retention-based data management for network-based data stores as described herein may be executed on one or more computer systems, which may interact with various other devices. FIG. 11 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the data warehouse system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a multi-tenant provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of persistent storage devices that store data for a network-based data store;
a plurality of compute nodes that implement a control plane for the network-based data store;
a network-based interface for the network-based data store;
the control plane, configured to:
receive a request to store a data object via the network-based interface at the network-based data store, wherein the request indicates a data retention time for the data object;
identify a plurality of candidate storage locations at the persistent storage devices to place the data object, wherein one of the plurality of candidate storage locations at a persistent storage device of the persistent storage devices is identified among other locations at the persistent storage device according to the data retention time;
place the data object at one or more of the candidate storage locations.

2. The system of claim 1, wherein the control plane is further configured to:
receive another request to store a different data object via the network-based interface at the network-based data store;
apply one or more retention rules to determine a retention time for the other data object;
identify a plurality of other candidate storage locations at the persistent storage devices to place the other data object according to the data retention time for the other data object; and
place the other data object at one or more of the other candidate storage locations.

3. The system of claim 1, wherein the control plane is further configured to:
receive a request to delete the data object from the network-based data store;
identify respective retention times for one or more other data objects stored at the one or more candidate storage locations storing the data object; and
based, at least in part, on the respective retention times for the one or more other data objects, mark the data for subsequent deletion in order to delay deletion of the data object until deleting at least one of the other data objects.

4. The system of claim 1, wherein the plurality of persistent storage devices are shingled magnetic recording devices, wherein the network-based data store is an object storage service, and wherein the data is stored a client for a client of the object storage service and associated with a particular customer account.

5. A method, comprising:
performing, by one or more computing devices:
receiving data to be stored in a network-based data store;
determining a retention time for maintaining the data in the network-based data store;
selecting one or more storage locations at one or more persistent storage devices implemented as part of the network-based data store to place the data, wherein selecting one of the one or more storage locations at a persistent storage device of the one or more persistent storage devices comprises selecting among locations at the persistent storage device according to the data retention time; and
placing the data at the one or more storage locations.

6. The method of claim 5, wherein determining the retention time for maintaining the data in the network-based data store comprises evaluating a request from a client to store the data that indicates a retention time for the data.

7. The method of claim 5, wherein determining the retention time for maintaining the data in the network-based data store comprises applying one or more retention rules to determine the retention time.

8. The method of claim 5, further comprising:
receiving a request to delete the data from the network-based data store;
identifying one or more respective retention times for other data stored at the one or more storage locations storing the data; and
based, at least in part, on the one or more respective retention times for the other data, delaying deletion of the data such that the data is deleted with at least some of the other data.

9. The method of claim 5, wherein the one or more persistent storage devices are one or more shingled magnetic recording devices.

10. The method of claim 9, wherein selecting the one or more storage locations at the one or more persistent storage devices comprises identifying a portion of a region of the one or more shingled magnetic recording devices that overlaps other data with a longer retention time.

11. The method of claim 5, wherein the data is stored as a plurality of data replicas at the one or more storage locations in the network-based data store in order to satisfy a durability policy for the data, and wherein the method further comprises:
detecting a failure of one or more of the replicas of the data;
evaluating the retention time of the data with respect to the durability policy; and
based, at least in part, on the evaluation, determining that remaining live replicas of the data satisfy the durability policy for the data.

12. The method of claim 5,
wherein a request is received from a client to store the data that indicates that the data is sent incrementally;
wherein receiving the data comprises receiving a plurality of chunks of the data via a streaming connection between the network-based data store and the client; and
wherein the determined retention time is a same retention time for the plurality of chunks of the data;
wherein selecting the one or more storage locations is based, at least in part, on determining space for storing one or more subsequent chunks of the data in addition to a first chunk of the data; and wherein placing the data comprises appending the plurality of data chunks to the one or more storage locations as the data chunks are received.

13. The method of claim 5, wherein the network-based data store is a storage service implemented as part of a provider network, and wherein the data is stored for a client of the storage service and associated with a particular customer account of the provider network.

14. A non-transitory, computer-readable storage medium, storing program instructions that when executed by one or more computing devices cause the one or more computing devices to implement:

receiving a request to store data in a network-based data store;

determining a retention time for maintaining the data in the network-based data store;

identifying a plurality of candidate storage locations at a plurality of persistent storage devices implemented as part of the network-based data store to place the data according to the data retention time, comprising determining a retention time for other data stored at one or more of the candidate storage locations that would be overlapped by the data upon placement of the data at the one or more storage locations, wherein respective ones of the persistent storage devices that implement the one or more candidate storage locations are shingled magnetic recording devices; and placing the data at one or more of the candidate storage locations.

15. The non-transitory, computer-readable storage medium of claim 14, wherein the program instructions cause the one or more computing devices to further implement:

receiving a request to store different data at the network-based data store, wherein the request indicates a data retention time for the different data;

identifying a plurality of other candidate storage locations at the persistent storage devices to place the different data according to the data retention time for the different data; and placing the different data at one or more of the other candidate storage locations.

16. The non-transitory, computer-readable storage medium of claim 14, wherein the program instructions cause the one or more computing devices to further implement:

receiving a request to delete the data from the network-based data store;

identifying one or more respective retention times for other data stored at the one or more storage locations storing the data; and based, at least in part, on the one or more respective retention times for the other data, delaying deletion of the data such that the data is deleted with at least some of the other data.

17. The non-transitory, computer-readable storage medium of claim 14, wherein at least some of the persistent storage devices are not shingled magnetic recording devices.

18. The non-transitory, computer-readable storage medium of claim 17, wherein, in identifying the plurality of candidate storage locations at the plurality of persistent storage devices, the program instructions cause the one or more computing devices to implement identifying storage regions at the shingled magnetic recording devices that are sized to the data.

19. The non-transitory, computer-readable storage medium of claim 18, wherein, in identifying storage regions at the shingled magnetic recording devices that are sized to the data, the program instructions cause the one or more computing devices to implement sizing a storage region at one or more of the shingled magnetic recording devices to store the data.

20. The non-transitory, computer-readable storage medium of claim 14, wherein the network-based data store is an object storage service, and wherein the data is stored a client for a client of the object storage service and associated with a particular customer account.

* * * * *